United States Patent
Barbu et al.

(10) Patent No.: US 9,591,240 B1
(45) Date of Patent: Mar. 7, 2017

(54) SYSTEM AND METHOD FOR GENERATING A DATASET FOR REAL NOISE REDUCTION EVALUATION

(71) Applicant: The Florida State University Research Foundation, Inc., Tallahassee, FL (US)

(72) Inventors: Adrian Barbu, Tallahassee, FL (US); Josue Anaya, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 14/954,402

(22) Filed: Nov. 30, 2015

Related U.S. Application Data

(60) Provisional application No. 62/085,933, filed on Dec. 1, 2014.

(51) Int. Cl.

| | |
|---|---|
| *G06K 9/40* | (2006.01) |
| *H04N 5/357* | (2011.01) |
| *H04N 5/235* | (2006.01) |
| *G06K 9/32* | (2006.01) |
| *G06T 5/00* | (2006.01) |

(52) U.S. Cl.
CPC ............... *H04N 5/357* (2013.01); *G06K 9/32* (2013.01); *G06K 9/40* (2013.01); *G06T 5/002* (2013.01); *G06T 5/003* (2013.01); *H04N 5/2353* (2013.01); *H04N 5/2354* (2013.01); *G06T 2207/10024* (2013.01)

(58) Field of Classification Search
CPC .. G06T 5/001; G06T 5/20; G06T 5/40; G06T 5/50; G06K 9/40; H04N 7/26888; H04N 1/4097
See application file for complete search history.

(56) References Cited

U.S. PATENT DOCUMENTS

| 4,897,878 | A | * | 1/1990 | Boll | ....................... G10L 15/20 704/233 |
|---|---|---|---|---|---|
| 4,918,633 | A | * | 4/1990 | Sullivan | .................. G06K 9/40 375/245 |

(Continued)

OTHER PUBLICATIONS

DxOMark sensor scores. DxOmark Reference for Image Quality. Date Accessed Jan. 7, 2016. http://www.dxomark.com/About/Sensor-scores/Use-Case-Scores.

(Continued)

*Primary Examiner* — Amir Alavi
(74) *Attorney, Agent, or Firm* — Molly L. Sauter; Smith & Hopen, P.A.

(57) ABSTRACT

The present invention provides a system and method for generating a dataset of uncompressed color images taken with three digital cameras and exhibiting different levels of real noise, resulting from low-light conditions. For each scene there are, on average, two low-noise and two noisy images that are aligned at the pixel level both spatially and in intensity. In one embodiment, the dataset contains over 100 scenes and more than 400 images, including both 16-bit RAW formatted images and 8-bit BMP pixel and intensity aligned images from three digital cameras. The generated dataset of real noise images is useful in the evaluation of denoising algorithms.

20 Claims, 13 Drawing Sheets
(12 of 13 Drawing Sheet(s) Filed in Color)

(56) References Cited

U.S. PATENT DOCUMENTS

| | | | | |
|---|---|---|---|---|
| 6,226,415 | B1* | 5/2001 | Wilson | G03H 1/28 359/7 |
| 6,512,854 | B1* | 1/2003 | Mucci | G06T 5/002 382/128 |
| 7,672,529 | B2* | 3/2010 | Chiu | G06K 9/40 382/261 |
| 8,547,444 | B2* | 10/2013 | Kinrot | G06T 5/003 348/208.99 |
| 9,105,078 | B2* | 8/2015 | Lim | G06T 5/001 |
| 9,374,506 | B2* | 6/2016 | Biswas | G06T 5/002 |
| 2014/0328509 | A1* | 11/2014 | Guissin | G06T 5/002 382/100 |

OTHER PUBLICATIONS

Teo and Heeger. Perceptual image distortion. IEEE International Conference for Image Processing (ICIP 94). 1994. vol. 2: 982-986.

Foi et al., Practical poissonian-gaussian noise modeling and fitting for single-image raw-data. IEEE Transactions on Image Processing. 2008. vol. 17 (No. 10): 1737-1754.

Luisier et al., Image denoising in mixed poissongaussian noise. IEEE Transactions on Image Processing. 2011. vol. 20 (No. 3): 696-708.

Ponomarnko et al., Color image database for evaluation of image quality metrics. IEEE 10th Workshop on Multimedia Signal Processing. 2008: 403-408.

Estrada et al., Image denoising benchmark. Release Date Mar. 25, 2010. Date Accessed Jan. 11, 2015 http://www.cs.utoronto.ca/strider/Denoise/Benchmark/.

Estrada et al., Stochastic image denoising. British Machine Vision Conf. 2009: 1-11.

Roth and Black. Fields of experts: A framework for learning image priors. IEEE Computer Society Conference on Computer Vision and Pattern Recognition (CVPR 2005). 2005. vol. 2: 1-8.

Burger et al., Image denoising: Can plain neural networks compete with bm3d?. IEEE Conference on Computer Vision and Pattern Recognition (CVPR). 2012: 2392-2399.

Ishii et al., Denoising via nonlinear image decomposition for a digital color camera. IEEE Interniational Conference on Image Processing (ICIP 2007). 2007. vol. 1: I-309-I-312.

Park et al., A case for denoising before demosaicking color filter array data. 2009 Conference Record of the Forty-Third Asilomar Conference on Signals, Systems and Computers. 2009: 860-864.

Hirakawa and Parks. Joint demosaicing and denoising. IEEE Transactions on Image Processing. 2006. vol. 15 (No. 8): 2146-2157.

Hirakawa and Parks. Adaptive homogeneity-directed demosaicing algorithm. IEEE Transactions on Image Processing 2005. vol. 14 (No. 3): 360-369.

Healey and Kondepudy. Radiometric CCD camera calibration and noise estimation. IEEE Transactions on Pattern Analysis and Machine Intelligence. 1994. vol. 16 (No. 3): 267-276.

Wang et al., Image quality assessment: from error visibility to structural similarity. IEEE Transactions on Image Processing.2004. vol. 13(No. 4): 600-612.

Chandler and Hemami. Vsnr: A wavelet-based visual signal-to-noise ratio for natural images. IEEE Transactions on Image Processing. 2007. vol. 16 (No. 9): 2284-2298.

Alter et al., An intensity similarity measure in low-light conditions. 9th European Conference on Computer Vision (ECCV 2006), Part IV, LCNS. vol. 3954: 267-280.

Barbu. Training an active random field for real-time image denoising. IEEE Transactions on Image Processing. 2009. vol. 18 (No. 11): 2451-2462.

Dabov et al., Image denoising by sparse 3-d transform-domain collaborative filtering. IEEE Transactions on Image Processing. 2007. vol. 16 (No. 8): 2080-2095.

Lecun et al, Efficient back prop. Neural Networks: Tricks of the Trade, LNCS. 1998. vol. 1524: 9-50.

Burger et al., Image denoising with multi-layer perceptrons, part1: comparison with existing algorithms and with bounds. Journal of Machine Learning Research. 2012. 1-38.

\* cited by examiner

SYSTEM AND METHOD FOR GENERATING A DATASET FOR REAL NOISE REDUCTION EVALUATION

CROSS-REFERENCE TO RELATED APPLICATIONS

This invention claims priority to U.S. Provisional Patent Application No. 62/085,933 filed Dec. 1, 2014 entitled "System and Method for Generating a Benchmark Dataset For Real Noise Reduction Evaluation", the content of which is incorporated herein by reference.

FEDERALLY SPONSORED RESEARCH OR DEVELOPMENT

This invention was made with government support under Defense Advanced Research Projects Agency (DARPA) MSEE Grant No. FA 8650-11-1-7149. The government has certain rights in the invention.

FIELD OF INVENTION

This invention relates to the generation of datasets for the analysis of various denoising algorithms.

BACKGROUND OF THE INVENTION

In the field of computer vision and computational photography, noise reduction is the application in which granular discrepancies found in images are removed.

Many modern and popular consumer based cameras in digital photography deal with the issues of low-light noise. The issue of low-light noise for a particular digital camera is so important that it is used as a valuable metric of the camera sensor and for determining how well the camera performs. It is for that reason that the problem of low-light image noise reduction is studied and has led to a variety of different methods.

In general, most of the performance evaluations for these various noise reduction methods are performed on small images contaminated with artificial noise (Gaussian, Poisson, salt and pepper, etc.), which is artificially added to a clean image to obtain a noisy version of the image. Measuring the performance of a noise reduction algorithm on small images corrupted by artificial noise might not give an accurate enough picture of the denoising performance of the algorithm on real digital camera or mobile images in low-light conditions.

Accordingly, what is needed in the art is a system and method for generating a dataset of images that is better suited for the analysis of various denoising methods. In particular, the present invention provides a system and method for generating a database of images corrupted by real camera noise.

SUMMARY OF THE INVENTION

The present invention provides a system and method for generating a dataset of uncompressed color images taken with three digital cameras and exhibiting different levels of natural noise, due to low-light conditions. For each scene there are, on average, two low-noise and two high-noise images that are aligned at the pixel level both spatially and in intensity. In one embodiment, the dataset contains over 100 scenes and more than 400 images, including both 16-bit RAW formatted images and 8 bit BMP pixel and intensity-aligned images.

The present invention provides a method for generating a dataset of real noise images, which includes, acquiring a set of images of a scene, the set of images comprising a low-noise reference image, at least one noisy image and a low-noise clean image of the scene, the low-noise reference image, the at least one noisy image and the low-noise clean image comprising a plurality of pixel intensities, wherein each of the plurality of pixel intensities comprises a first plurality of bits. The method further includes, mapping the first plurality of bits of each of the pixel intensities of the low-noise reference image to a second plurality of bits using linear mapping, wherein the second plurality of bits is less than the first plurality of bits and mapping the first plurality of bits of each of the pixel intensities of the at least one noisy image and the low-noise clean image to a second plurality of bits using energy minimization linear mapping to align the at least one noisy image and the low-noise clean image with the reference image, wherein the second plurality of bits is less than the first plurality of bits. The set of scene images mapped to the second plurality of bits in a dataset of real noise images are then stored to provide a dataset of real noise images.

In a specific embodiment, the first plurality of bits is 16 bits and the second plurality of bits is 8 bits and the pixel intensities of the images are mapped from a 16-bit value to an 8-bit value.

In another embodiment, the present invention includes, a dataset of real noise images stored on one or more non-transitory computer-readable media, the dataset comprising, a plurality of sets of images of a plurality of scenes, each of the plurality of set of images comprising a low-noise reference image, at least one noisy image and a low-noise clean image of one of the plurality scenes, the low-noise reference image, the at least one noisy image and the low-noise clean image comprising a plurality of pixel intensities, wherein each of the plurality of pixel intensities comprises a first plurality of bits, and wherein, for each of the plurality of sets o images, the first plurality of bits of each of the pixel intensities of the low-noise reference image is mapped to a second plurality of bits using linear mapping, and the first plurality of bits of each of the pixel intensities of the at least one noisy image and the low-noise clean image to a second plurality of bits is mapped to the second plurality of bits using energy minimization linear mapping to align the at least one noisy image and the low-noise clean image with the reference image, wherein the second plurality of bits is less than the first plurality of bits.

In accordance with an additional embodiment, the present invention includes, one or more non-transitory computer-readable media having computer-executable instructions for performing a method of running a software program on a computing device, the computing device operating under an operating system, the method including issuing instructions from the software program comprising, acquiring a set of images of a scene, the set of images comprising a low-noise reference image, at least one noisy image and a low-noise clean image of the scene, the low-noise reference image, the at least one noisy image and the low-noise clean image comprising a plurality of pixel intensities, wherein each of the plurality of pixel intensities comprises a first plurality of bits. The instructions further include, mapping the first plurality of bits of each of the pixel intensities of the low-noise reference image to a second plurality of bits using linear mapping, wherein the second plurality of bits is less than the first plurality of bits, mapping the first plurality of bits of each of the pixel intensities of the at least one noisy image and the low-noise clean image to a second plurality of bits using energy minimization linear mapping to align the at least one noisy image and the low-noise clean image with the reference image, wherein the second plurality of bits is less than the first plurality of bits and storing the set of scene images mapped to the second plurality of bits in a dataset of real noise images.

As such, the present invention provides a system and method for generating a dataset of real noise images that is better suited for the analysis of various denoising methods, and in particular, the present invention provides a system and method for generating a database of images corrupted by real camera noise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

Figure 1A:
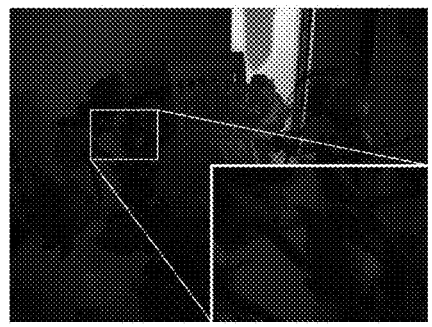
FIG. 1A is an exemplary illustration of a low-noise clean image of a scene taken using a Canon PowerShot S90 camera.
Figure 1B:
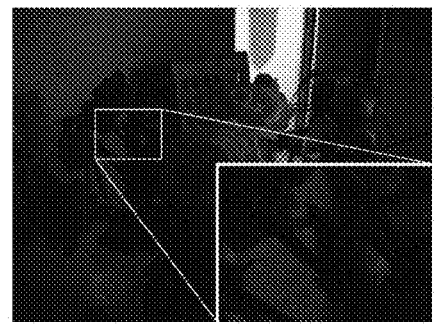
FIG. 1B is an exemplary illustration of a noisy image of the scene taken using a Canon PowerShot S90 camera.
Figure 1C:
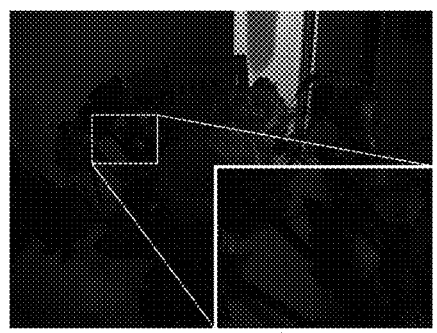
FIG. 1C is an exemplary illustration of corresponding blue channel of a low-noise clean image of the scene taken using a Canon PowerShot S90 camera.
Figure 1D:
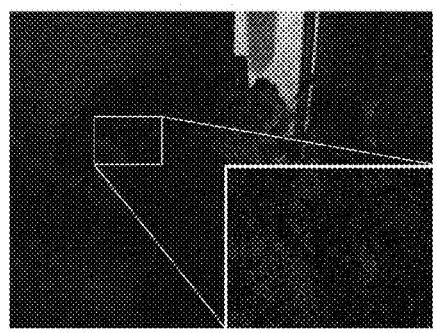
FIG. 1D is an exemplary illustration of corresponding blue channel of a noisy image image of the scene taken using a Canon PowerShot S90 camera.

Various denoising methodologies are known in the art for learning information from noisy and non-noisy image pairs to construct a generalized mapping for processing subsequent noisy images. It is therefore very important to maintain a careful construction of the noisy and non-noisy image pairs, wherein the noisy images include real camera noise. The inherent difficulty in constructing an appropriate set of images is the reason that simple grayscale images having artificial noise have typically been used in prior art methods. As stated previously, the grayscale images used in the prior art methods include artificial noise which is not fully representative of the images obtained from actual digital cameras under low-light conditions. Thus, it is desirable to construct a dataset of image pairs of clean and noisy images acquired by digital cameras under various lighting conditions. Additionally, the nature of the noise in low-light camera images is more complex than independently and identically distributed noise, for example, its variance depends on the image intensity, so it would be desirable to obtain images naturally corrupted by low-light noise and their noise-free counterparts.

Most of the commercial digital cameras provide color images and it has been shown that the distribution of the low-light noise in the images is not Gaussian, but rather follows a more complex distribution with intensity-dependent variance. Although a variety of color image databases exist, the only image denoising database for benchmarking studies various denoising methods on color images corrupted by artificial Gaussian noise. The problem with artificial Gaussian noise is that a denoising method could be parameterized in such a way as to give the best possible performance of a simple noise model, but the method may still under-perform on images with real and more complex noise structures.

Additionally, different cameras and settings produce different kinds of noise which the various denoising methods attempt to learn. A denoising method that works best for a specific type of camera could be trained on noisy-clean image pairs for that specific camera and not on noisy-clean image pairs from a variety of different cameras. Trying to construct a dataset of various image pairs from various different cameras may help identifying which denoising method generalizes well over many different cameras, however it does not evaluate the full potential of that method on any one specific camera at various noise levels.

In accordance with an exemplary embodiment of the present invention, three digital cameras having different sensors sizes were studied: one with a relatively small sensor (i.e. Canon S90), one with a mid-size sensor (i.e. Canon T3i) and one with a large sensor (i.e. Nikon D700).

The dataset in accordance with the present invention comprises low-light, uncompressed, natural images of multiple scenes, wherein at least one image contains noise and two other images contain very little noise. In a particular embodiment, the dataset includes four images of each scene.

The presence of noise in the images of the inventive dataset is mainly due to the number of photons that are received by the camera's sensor at different exposure times and ISO levels and by the amplification process applied. In the present invention, the images in a low-light static scene are acquired under the following, "sandwich", procedure. In this procedure, a first low-noise reference image of a scene is obtained with a camera set to a low light sensitivity (i.e. ISO between 100 and 3200) and a long exposure time (i.e. at least ¼ seconds). Next, one or more noisy images of the scene are obtained with increased light sensitivity and a reduced exposure time (i.e. less than about ⅒ second) setting for the camera. Finally, a second low-noise clean image is taken with the same parameters as the first low-noise reference image. As such, there are two low-noise images acquired (reference image and clean image), one at the beginning and one at the end of the sequence, to be able to evaluate the quality of the whole acquisition process. If a motion or lighting change occurs during acquisition, the two low-noise images will be sufficiently different, as measured by the peak-signal-to-noise ratio (PSNR). If the PSNR of the low-noise reference and the clean images are sufficiently different, the images may be removed from dataset and the whole process may be repeated. In a particular embodiment, sequences with a PSNR for the reference images of less than about 35 may be discarded.

In an exemplary embodiment, the actual acquisition parameters for each of the three camera employed in the exemplary embodiment are presented in Table I.

TABLE I

ISO (and Exposure time) per camera

| Camera | Reference/Clean Images | | Noisy Images | |
|---|---|---|---|---|
| | ISO | Time(s) | ISO | Time(s) |
| Nikon | 100 | 1/1.3 | 3200 | 1/40 |
| S90 | 100 | 3.2 | 640 or 1000 | Auto |
| T3i | 100 | Auto | 3200 or 6400 | Auto |

Using the Canon Developer Tool Kit for the Canon S90 and the EOS Utility for the Canon Rebel T3i, the collection of the four images is programmed to be taken while trying to preserve the static scene in the images by not moving or refocusing the camera. The "sandwich" approach used to obtain the images also helps to insure that the only visual differences between the images of a scene are simply due to noise. All of the images were collected and saved in RAW format (CR2 for Canon and NEF for Nikon).

An example of one of the images in the dataset is illustrated with reference to FIG. 1A-FIG. 1D. In total, 51 scenes for the S90, 40 scenes for the T3i and 26 scenes for the Nikon were collected in this exemplary embodiment.

While the present invention provides far fewer noising images than other techniques currently known in the art, as shown in Table II, the image database of the present invention contains about 60 times more pixels, and therefore more patch variability for study from just one of the three cameras.

TABLE II

Description of Dataset and Size

| Camera | Image Size | Sensor Size (mm) | Number of Scenes | Noisy Images | | | | Clean Images | | | |
|---|---|---|---|---|---|---|---|---|---|---|---|
| | | | | σ Avg. | PSNR Min. | PSNR Avg. | PSNR Max. | σ Avg. | PSNR Min. | PSNR Av. | PSNR Max |
| S90 | 3684 × 2760 | 7.4 × 5.6 | 51 | 18.249 | 17.429 | 26.187 | 33.388 | 3.067 | 35.032 | 38.698 | 43.425 |
| T3i | 5202 × 3465 | 22.3 × 14.9 | 40 | 11.774 | 19.762 | 27.472 | 35.642 | 2.949 | 34.999 | 39.189 | 43.355 |
| Nikon | 4284 × 2844 | 36 × 24 | 26 | 9.515 | 21.499 | 29.772 | 38.827 | 2.372 | 34.630 | 41.583 | 48.710 |

Many various denoising methods learn information from the noisy-clean image pairs in order to construct some kind of generalized mapping for future noisy images. For this reason and for evaluation in general, it is very important to maintain a careful construction of these noisy-clean image pairs and to have many examples for a representative dataset. The difficulty in constructing such pairs is the reason prior art methods have relied on the use of artificial noise.

In accordance with the present invention, the following notations are assumed to apply:

R, $I^r$—the first low-noise reference image
C, $I^c$—the second low-noise reference image
N, $I^n$—the noisy image
X—one of the low-noise reference or noisy images
T, $I^{GT}$—the unknown ground truth images
$\epsilon$, $\epsilon_r$, $\epsilon_c$—random variables for the first and second low-noise reference images
$\epsilon_n$—random variables for the noisy images
$\sigma^2(X)$=var(X) the variance of an random variable, X It is assumed that the two low-noise reference images $I^r$ and $I^c$ and the at least one noisy image $I^n$ are noisy versions of a common (unknown) ground truth image $I^{GT}$, corrupted by independently and identically distributed noise. It is noted that the two low-noise reference images have low amounts of noise because many photos have been accumulated on the sensor during the long exposure time. It is also assumed that the two low-noise reference images have the same noise distribution, since the two images are of the same static scene with the same ISO level and exposure time. Thus, $$I^r(x,y) = I^{GT}(x,y) + \epsilon_n(x,y) \tag{1}$$

$$I^r(x,y) = I^{GT}(x,y) + \epsilon_r(x,y) \tag{2}$$

$$I^c(x,y) = I^{GT}(x,y) + \epsilon_c(x,y) \tag{3}$$

In the present invention, the dataset construction extends beyond just the acquisition of the series of images of the scene. For the purposes of properly aligning the pixel intensities of the series of images of the scene, a new form in of brightness adjustment is presented that maps the 16-bit RAW images from the camera to an 8-bit uncompressed format. In general, the method includes acquiring a set of images of a scene, the set of images comprising a low-noise reference image, at least one noisy image and a low-noise clean image of the scene, the low-noise reference image, the at least one noisy image and the low-noise clean image comprising a plurality of pixel intensities, wherein each of the plurality of pixel intensities comprises a first plurality of bits. The method further includes, mapping the first plurality of bits of each of the pixel intensities of the low-noise reference image to a second plurality of bits using linear mapping, wherein the second plurality of bits is less than the first plurality of bits and mapping the first plurality of bits of each of the pixel intensities of the at least one noisy image and the low-noise clean image to a second plurality of bits using energy minimization linear mapping to align the at least one noisy image and the low-noise clean image with the reference image, wherein the second plurality of bits is less than the first plurality of bits.

In a particular embodiment of the method, the reference image is mapped from 16-bit to 8 bit by computing the cumulative distribution of the 16-bit pixel intensities of the first RAW reference image and identifying the value that represents the 99th percentile. A linear scaling of the RAW reference image that sets the 99th percentile value to the intensity value 230 in the 8-bit image is then constructed. Thus, 1% of the pixels are mapped to intensities above 230 and even fewer will be saturated to an intensity value of 255.

Selection of the 99$^{th}$ percentile and the intensity value of 230 are exemplary in nature and various other percentile and intensity values may be selected in accordance with various embodiment of the invention.

The noisy images and the clean image of the series of the same scene are then reduced to 8-bit images, following the same process as that of the reference image, wherein the noisy image and the clean image are aligned to the reference image by finding a 16-bit to 8-bit linear mapping via energy minimization. As such, the noisy images and the clean image are aligned to the 8-bit reference image by finding a linear mapping specified by parameters $\alpha$ and, $\beta$ such that if I is the 16-bit image, $\alpha I + \beta$ becomes the 8-bit aligned image after its values larger than 255 or less than 0 have been truncated. For better accuracy of the intensity alignment, instead of working with the two images, I, R, blurred versions $\tilde{I}$, $\tilde{R}$, that were obtained by convolution with a Gaussian kernel with $\sigma=5$, and used in the intensity alignment. This way, the level of noise is reduced. To avoid biases obtained near intensity discontinuities, the alignment parameters are computed based on the low gradient pixels as:

$$M = \{i, |\nabla R(i)| < 1\} \tag{4}$$

Where the parameters ($\alpha$, $\beta$) are found to minimize:

$$\Sigma_{i \in M} [\tilde{R}(i) - \max(\alpha \tilde{I}(i) + \beta, 255), 0]^2 \tag{5}$$

In one embodiment, the minimization is performed by coordinate optimization using the golden section search in one dimension alternating optimization on $\alpha$ and $\beta$ until convergence. The golden section search is a technique known in the art for finding the extremum (minimum or maximum) of a strictly unimodal function by successively narrowing the range of values inside which the extremum is known to exist.

Figure 3A:
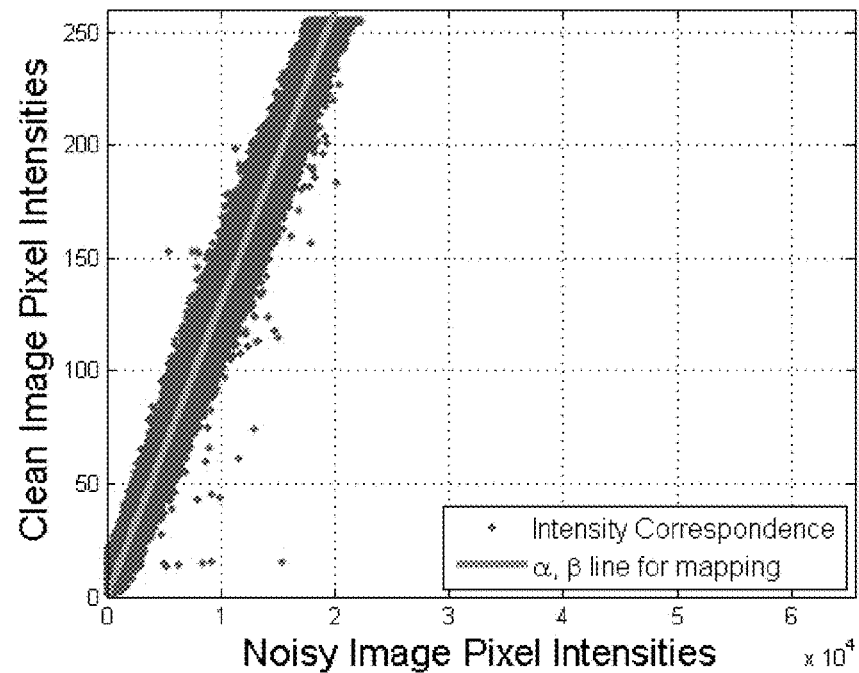
FIG. 3A is an exemplary illustration of a scatter plot of the pixel intensity correspondence between a low-noise clean image and its noisy image pair.
Figure 3B:
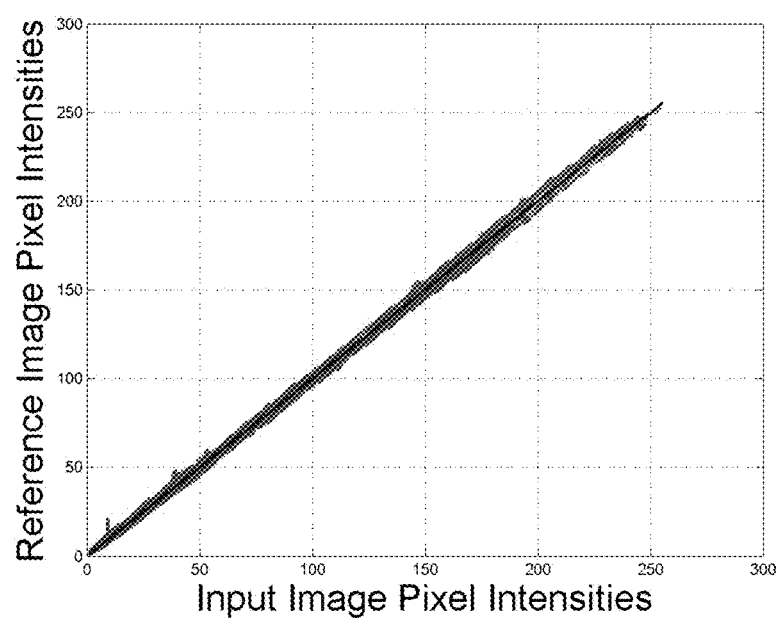
FIG. 3B is an exemplary illustration of a scatter plot of the pixel intensity correspondence between a low-noise reference and a blurred noisy image.
Figure 3C:
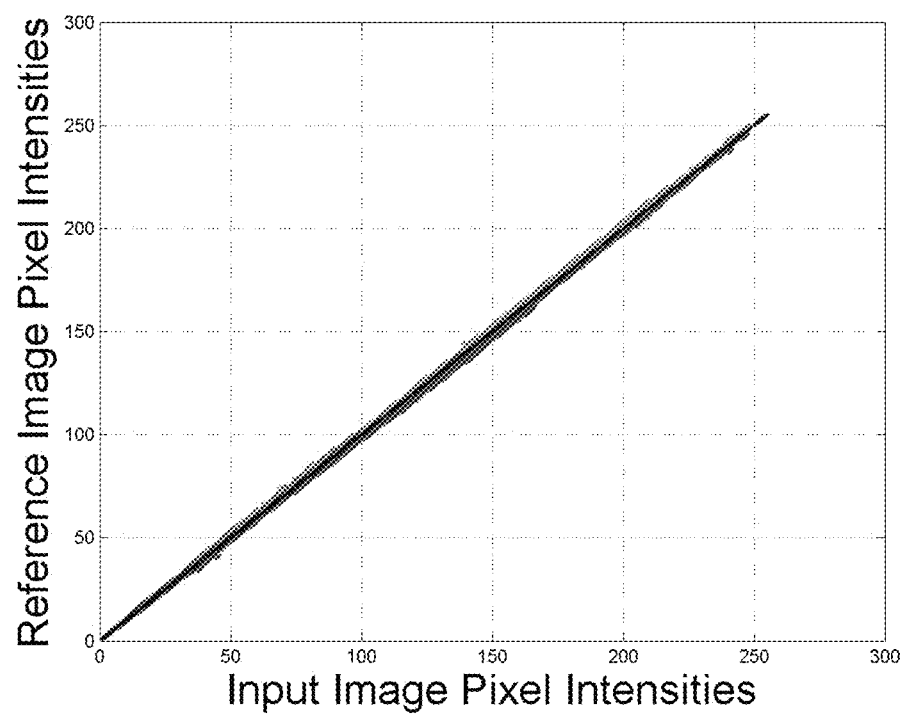
FIG. 3C is an exemplary illustration of a scatter plot of the pixel intensity correspondence between a low-noise reference image and a blurred noisy image after alignment.

FIG. 3A-3C illustrates an example of the mapping between the pixels M of $\tilde{I}$, $\tilde{R}$. FIG. 3A illustrates the correspondence between the red channel of the 8-bit reference image and the red channel for the 16-bit noisy image. The line shows $\alpha$ and $\beta$ values used for mapping. FIG. 3B illustrates the correspondence between the clean 8-bit and the blurred noisy 8-bit image after alignment in all three color channels. FIG. 3C illustrates the correspondence between the 8-bit reference image and the 8-bit blurred clean image after alignment. Plots like FIG. 3A-3C are obtained for all of the images in the dataset as a way of diagnosing any misalignment or nonlinear correspondence between clean and noisy images.

Figure 2A:
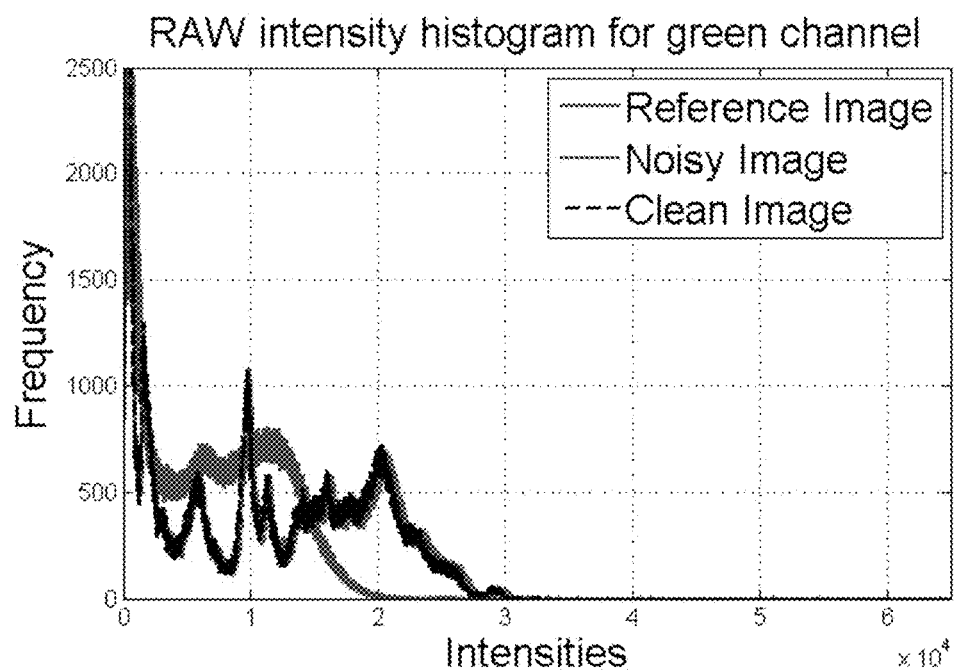
FIG. 2A is an exemplary illustration of a pixel intensity histogram for a low-noise clean image before intensity alignment.
Figure 2B:
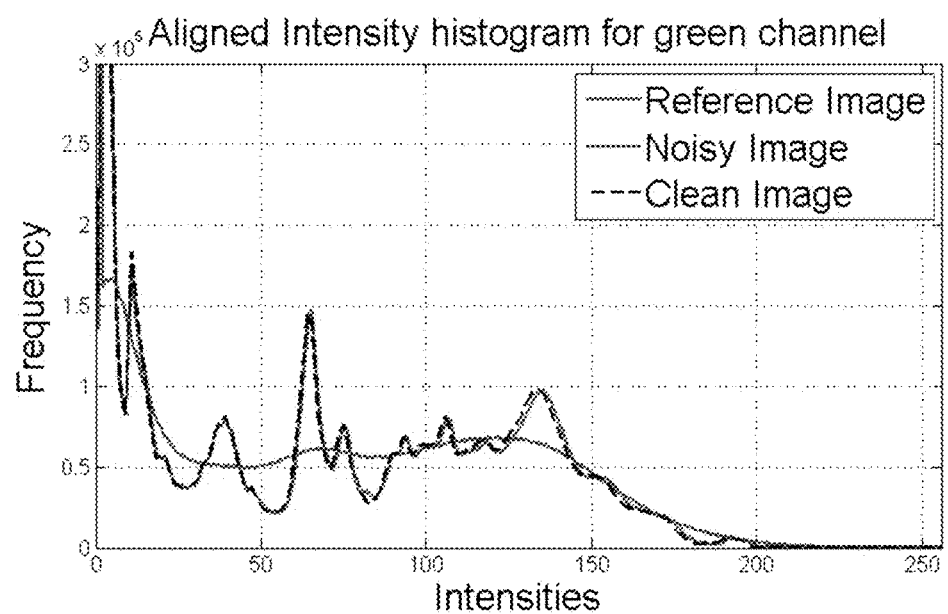
FIG. 2B is an exemplary illustration of a pixel intensity histogram for a low-noise clean image after intensity alignment.
Figure 4:
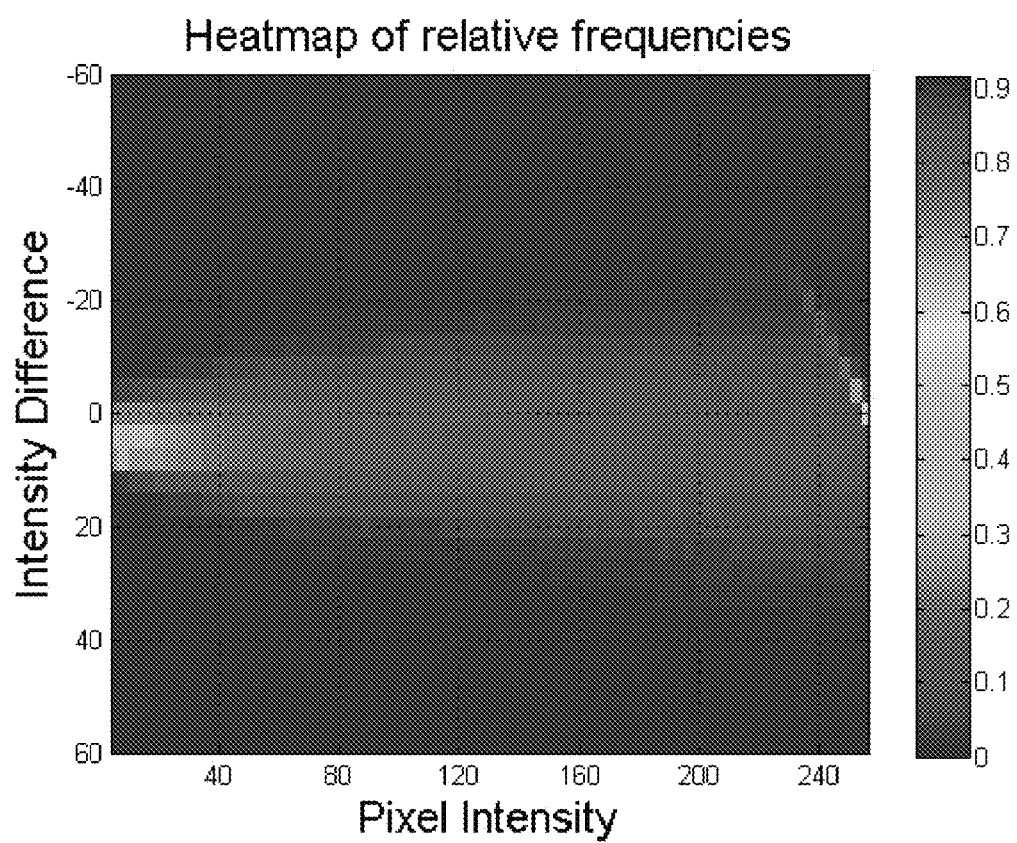
FIG. 4 is an illustration of the distribution of the difference in intensity values vs. pixel intensity in the clean image after alignment of a clean-noisy image pair.

The parameters ($\alpha$, $\beta$) obtained for the mapping are robust to outliers. FIG. 2A illustrates an example of the green channel for a particular image in the dataset before and FIG. 2B illustrates the example after alignment has been performed. FIG. 4 illustrates that the alignment process maintains a compact and static variance of intensity difference within ±30 intensity difference. However for larger pixel intensities an increase in variance of the intensity difference is illustrated, indicating that the noise variance depends upon the pixel intensity.

As stated previously, the amount of noise present in the dataset is due to the sensor and the amplification process. The fact that not all of the images were taken in the same environment, under the same camera settings, means that a wide variety of noise has been introduced into the images of the dataset. The fact that the invention is not dealing with artificial noise also means that the noise variance $\sigma^2$ is unknown prior to performing the calculations. However, the "sandwich" procedure for image acquisition of the present invention allows for the estimation of the noise level for any one of the images in the dataset.

Utilizing the fact that if two random variables A, B are independent, then var(A−B)=var(A)+var(B), or in other words $\sigma^2(A-B) = \sigma^2(A) + \sigma^2(B)$ where var(A), $\sigma$(A) are the variance and standard deviation of A, respectively. Then:

$$\sigma^2(I^r - I^c) = \text{var}(\epsilon_r - \epsilon_c) = \text{var}(\epsilon_r) + \text{var}(\epsilon_c) = 2\sigma^2(\epsilon) \tag{6}$$

from the independence of $\epsilon_r$ and $\epsilon_c$ and the fact that $\epsilon_r$ and $\epsilon_c$ come from the same distribution (and as such, can be represented as $\epsilon$). The estimation of the noise level in the first low-noise reference image and the second low-noise reference image is obtained by:

$$\sigma^2(I^r - I^{GT}) = \sigma^2(I^c - I^{GT}) = \sigma^2(\epsilon) = \frac{1}{2}\sigma^2(I^r - I^c) \tag{7}$$

For the noisy images:

$$\sigma^2(I^n - I^r) = \text{var}(\epsilon_n - \epsilon_r) = \sigma^2(\epsilon_n) + \sigma^2(\epsilon_r) \tag{8}$$

To obtain the estimation of the noise level in the noisy images:

$$\sigma^2(I^n - I^{GT}) = \sigma^2(\epsilon_n) = \sigma^2(I^n - I^r) - \frac{1}{2}\sigma^2(I^r - I^c) \tag{9}$$

If it is desired to use the best estimation of the ground truth (GT), which is $I^a=(I^r+I^c)/2$, then an alternative formula for the noise level in the noisy images can be used, wherein:

$$\sigma^2(\epsilon_n) = \text{var}(I^n - I^{GT}) = \text{var}(I^n - I^a) - \tfrac{1}{4}\text{var}(I^r - I^c) \quad (10)$$

Equations (7) and (9) can be used to estimate the true noise level for any image in the dataset.

Figure 5:
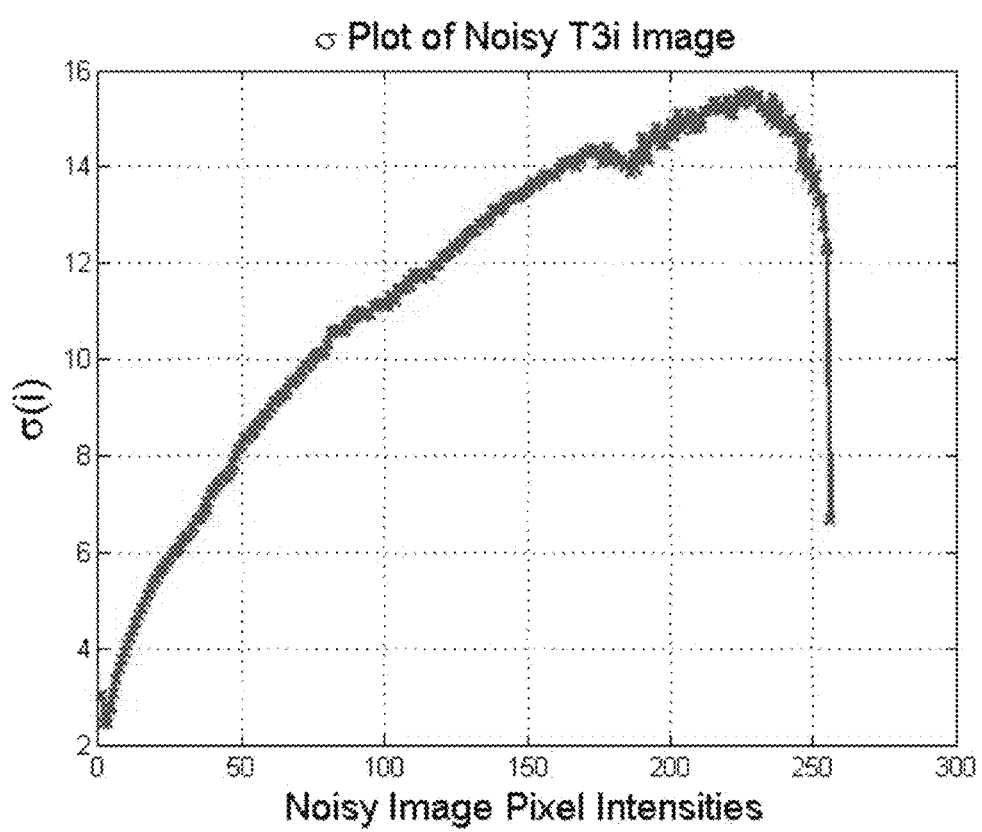
FIG. 5 is an exemplary illustration of the estimated sigma at various pixel intensities for a noisy image.

As stated previously, the noise depends on the image intensity. Equations (7), (9) and (10) return a single value estimate for the noise if $I^r$, $I^c$ and $I^n$ are allowed to be the usual entire image. As a result of the noise estimation framework of the present invention, corresponding subsets of if $I^r$, $I^c$ and $I^n$ are allowed and can also be used in local neighborhood noise estimation. It is through this result that the noise variance of an image can be estimated for each intensity level. An example of this concept is illustrated with reference to FIG. 5, which illustrates the estimated sigma at various pixel intensities for a noisy image.

As well as calculating the approximate noise level in every image, the image fidelity is also quantified across the image batches using various metrics such as PSNR (peak signal-to-noise ratio), SSIM (structural similarity index method), and VSNR (visual signal-to-noise ratio). In particular, the PSNR measurement is modified by incorporating the estimate of the noise from equation (9), as opposed to using the standard noise estimate from the difference image between a low-noise reference and noisy image in the series of images of the scene. Although specialized metrics exist for low-light conditions, in the present invention, the decision was made to use measures that are the most prevalent and common in practice.

Figure 6A:
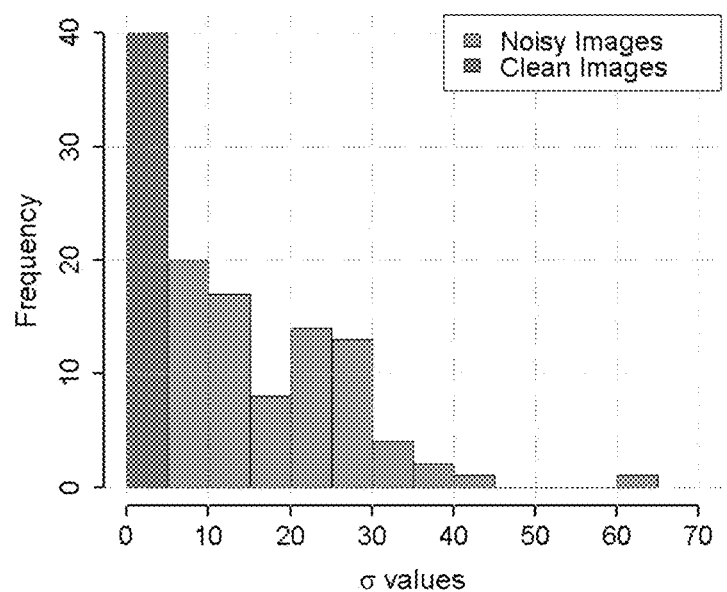
FIG. 6A is an exemplary illustration of various noise levels computer for the noisy and clean images obtained from the S90 camera.
Figure 6B:
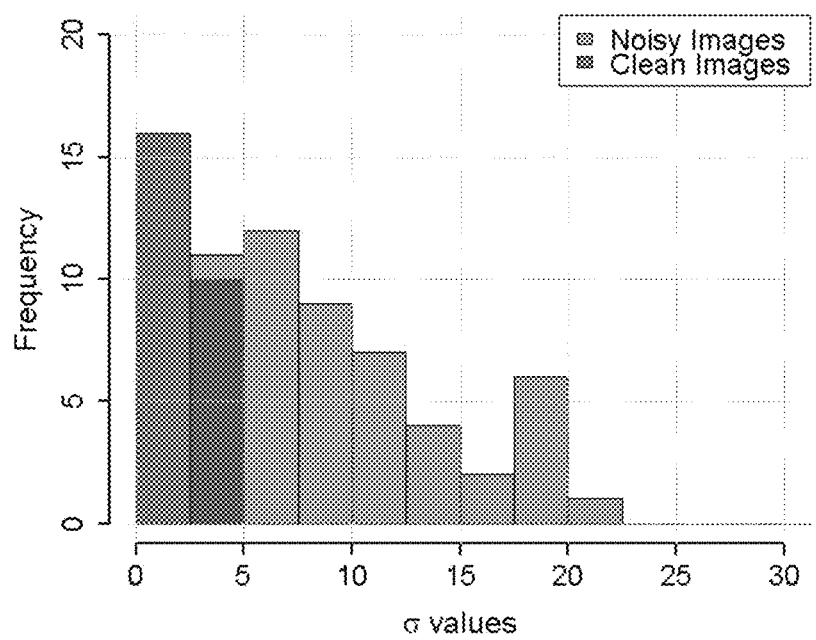
FIG. 6B is an exemplary illustration of various noise levels computer for the noisy and clean images obtained from the Nikon camera.
Figure 6C:
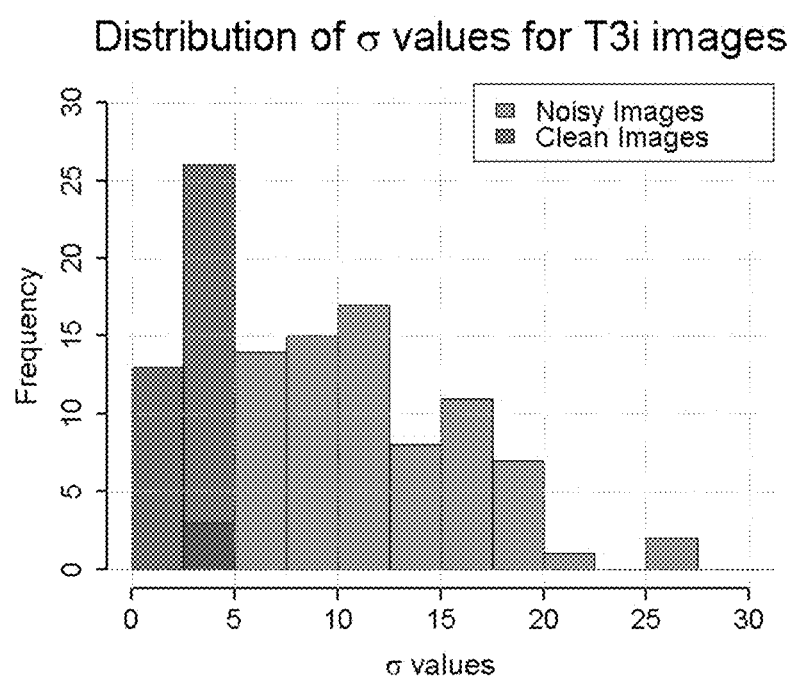
FIG. 6C is an exemplary illustration of various noise levels computer for the noisy and clean images obtained from the T3i camera.
Figure 7A:
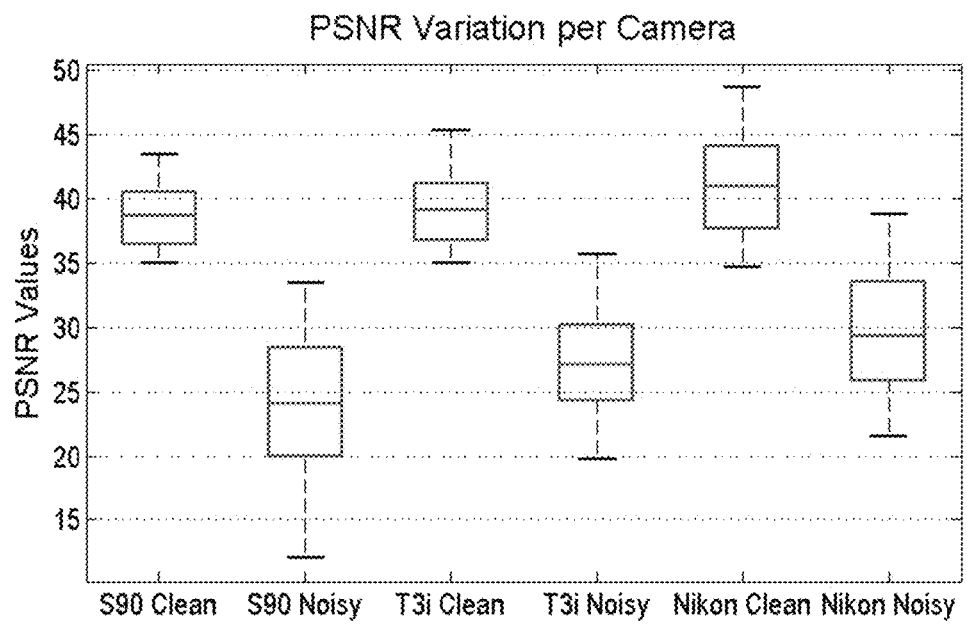
FIG. 7A is an exemplary illustration of the variation of PSNR associated with the noisy and clean images for each camera.
Figure 7B:
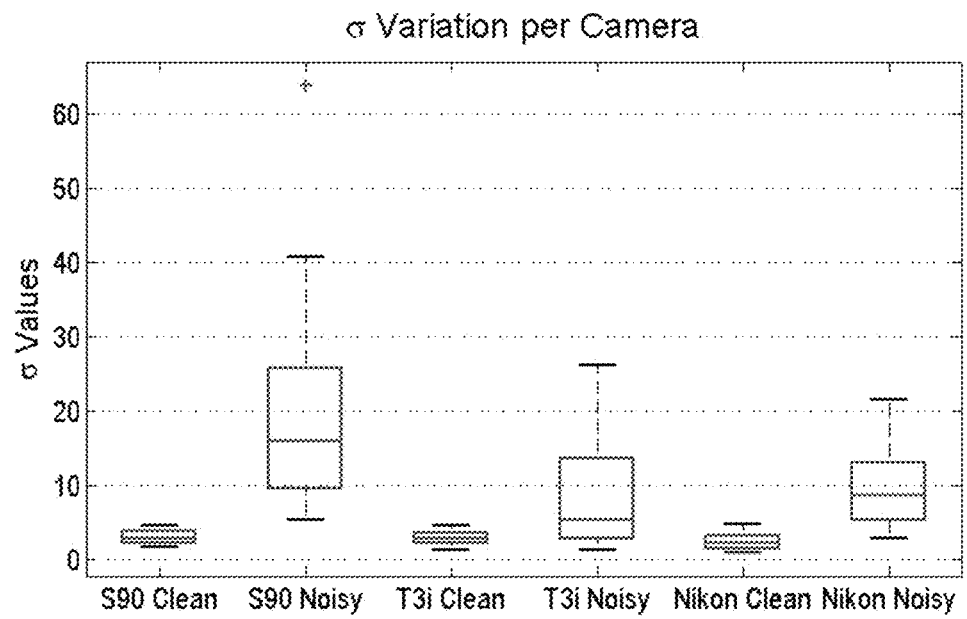
FIG. 7B is an exemplary illustration of the variation of sigma associated with the noisy and clean images for each camera.

Table II lists some specific characteristics about the various cameras and their images in the dataset. Note that the a in Table II comes from the estimates from equations (7) and (9). FIG. 6A-6C shows the distribution of noise levels for the noisy and low-noise images for each camera. FIG. 6A shows the distribution for the S90 camera. FIG. 6B shows the distribution for the Nikon camera. FIG. 6C shows the distribution for the Ti3 camera. FIG. 7A shows box-plots of the variation in PSNR for each of the cameras and FIG. 7B shows box-plots of the variation in noise levels for each camera.

To examine the noise estimation of the present invention, ten 16-bit RAW reference images for the three digital cameras were analyzed. First, a 16-bit RAW reference image was allowed to be considered as $I^{GT}$. The alignment method of the present invention was then used to construct n 8-bit version of $I^{GT}$. Next, $I^r$, $I^c$ and $I^n$ were generated by adding artificial Gaussian noise to the 16-bit $I^{GT}$. For 16-bit $I^r$ and $I^c$, $$\sigma = \frac{3}{\gamma}$$

amount of noise was added, where $\gamma$ is the multiplications factor to map the 16-bit $I^{GT}$ to an 8-bit $I^{GT}$. A 16-bit $I^n$ was generated using $$\sigma = \frac{10}{\gamma}.$$

Figure 8:
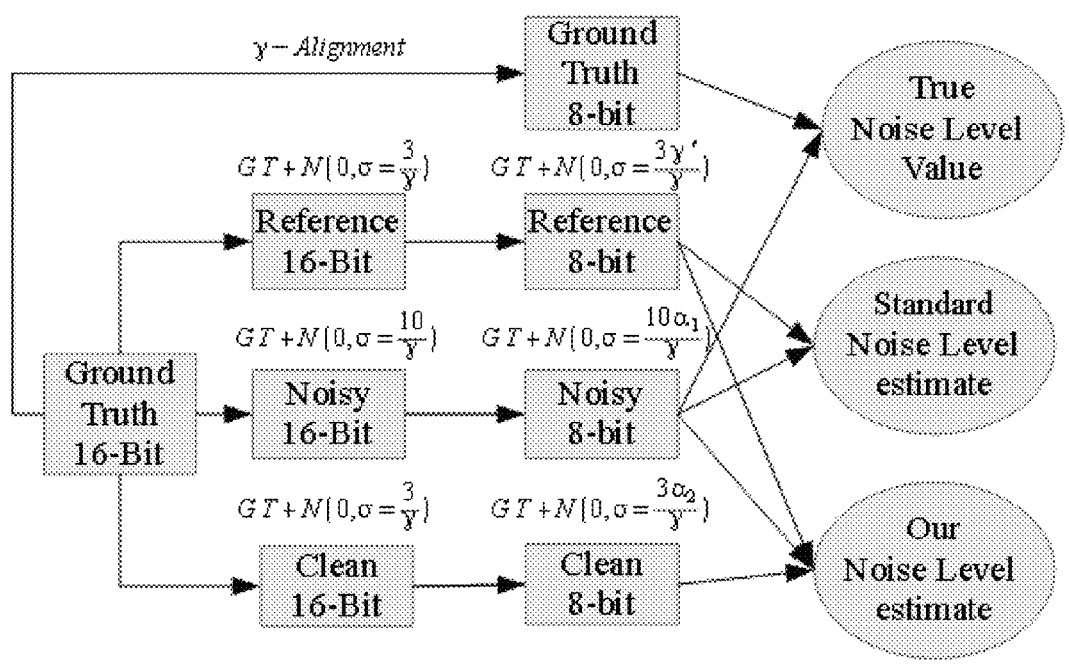
FIG. 8 is an exemplary illustration of the process for constructing the proper reference, clean, noisy and ground truth images necessary for the noise estimation evaluation.

Standard alignment was then performed on $I^r$, $I^c$ and $I^n$ to map them to 8-bit images. To insure that the 8-bit images had the desired noise level, new 16-bit $I^r$, $I^c$ and $I^n$ images from $I^{GT}$ using both $\gamma$ and the previous respective alignment from 16-bit to 8-bit. In this manner, the final noise level of the 8-bit $I^r$ and $I^c$ was approximately 3 and for $I^n$, the final noise level was approximately 10. An illustration of the above described procedure is shown with reference to FIG. 8.

To estimate the true value of noise for $I^r$, $I^c$ and $I^n$, the standard deviation of the difference between each of them and $I^{GT}$ was computed. These standard deviations were then compared to the standard estimate of the noise as $\sigma(I^n-I^r)$ and $\sigma(I^c-I^r)$ with the noise estimation of $I^c$ and $I^n$ using the inventive method of the present invention.

Figure 9A:
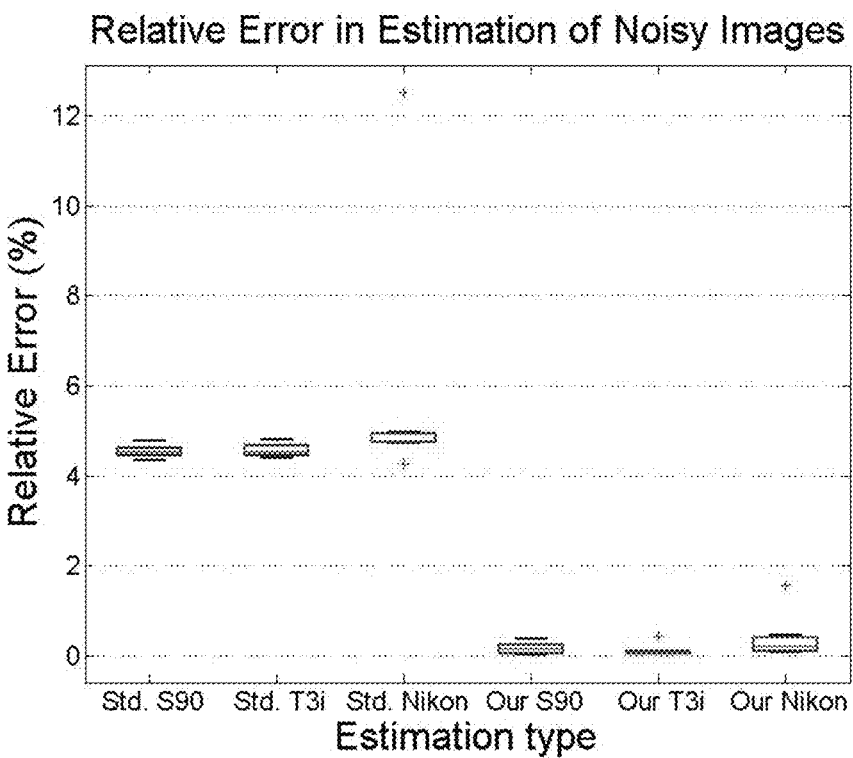
FIG. 9A is an exemplary illustration graphical illustration of the relative error in estimating noisy images, measured in percentages.
Figure 9B:
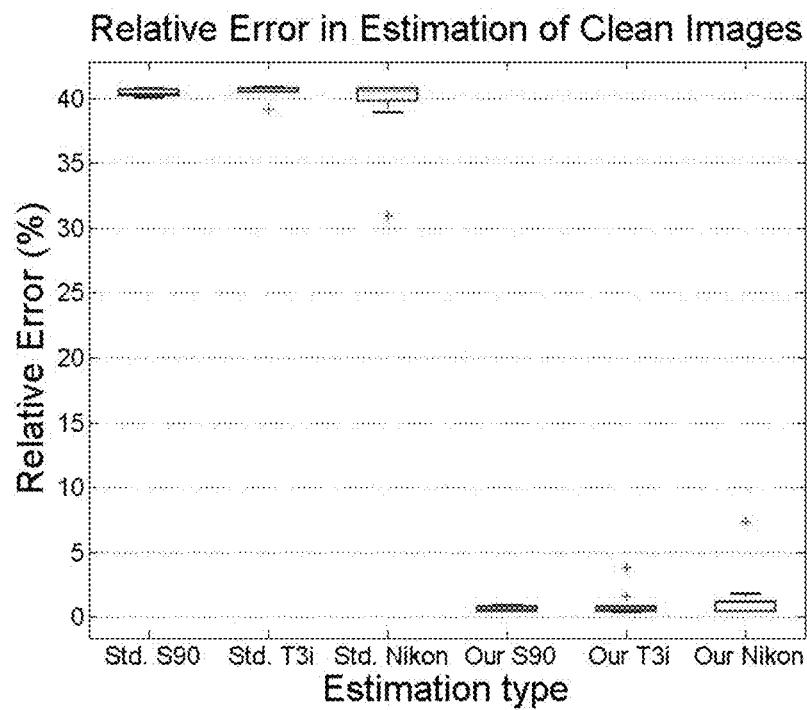
FIG. 9B is an exemplary illustration graphical illustration of the relative error in estimating clean images, measured in percentages.

FIG. 9A illustrates the relative error of estimating the noise level for clean images, $I^c$ and FIG. 9B illustrates the relative error of estimating the noise level for noisy images, $I^n$. Regarding the estimation of the noise level $I^n$, the method of estimation in accordance with the present invention kept the relative error to below 2%, while the standard method of estimating the noise level resulted in a relative error around 5%.

Figure 10A:
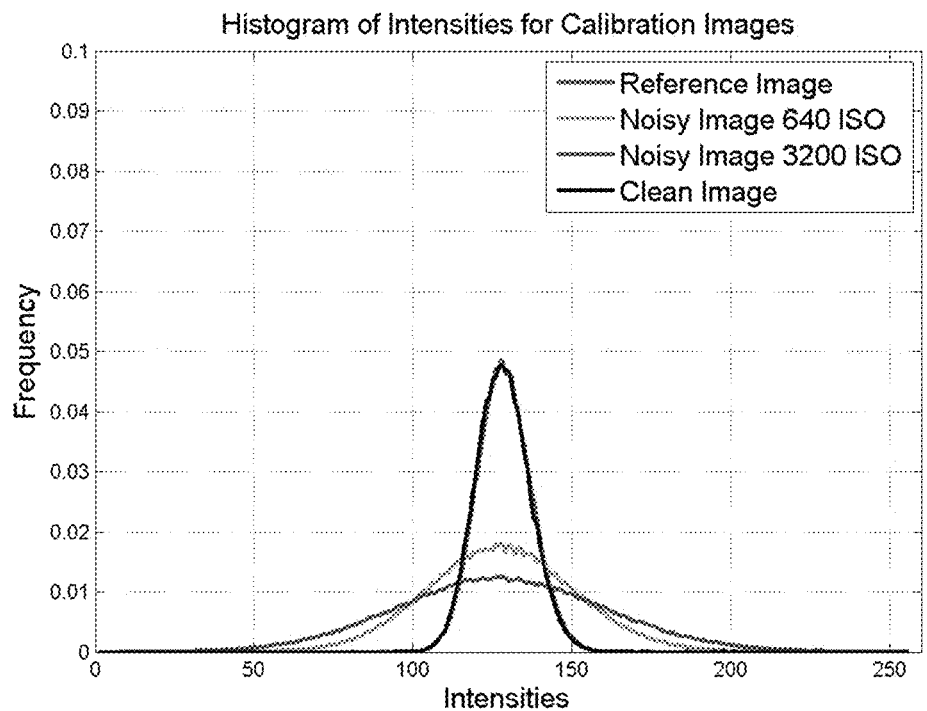
FIG. 10A is an exemplary illustration of the analysis of the calibration images for the green channels of the calibration images.
Figure 10B:
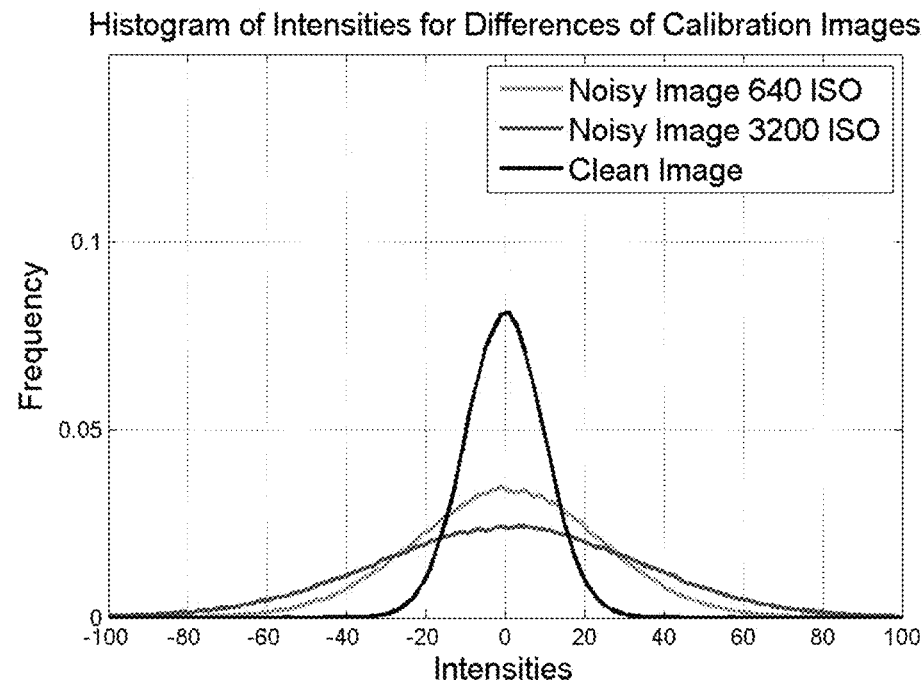
FIG. 10B is an exemplary illustration of the analysis of the calibration images for the distribution of values of the intensity difference between the reference calibration image and the various other images in the calibration dataset.

To further investigate how well the assumptions made regarding the noise hold, a calibration dataset of special scene was acquired with the S90 camera. The scene was of a constant intensity surface in low-light settings. Using the intensity alignment methodology of the present invention, instead of mapping the clean image from the $99^{th}$ quantile to the 230 pixel intensity, the median was mapped to the 128 pixel intensity. Using this mapping, the other two noisy images and the clean image were aligned using the Golden section method, as previously described. FIG. 10A illustrates the alignments of the calibration dataset and FIG. 10B illustrates a histogram of pixel differences between the reference image and the other images in the calibration dataset. Since it is known that the $I^{GT}$ was constant since the scene contained a constant intensity surface, a true value for $\sigma^2$ can immediately be obtained for each image by directly computing the intensity variance in the image. However, to account for smoothly changing illumination, a GT version for each image was constructed by Gaussian blurring it with a large spatial kernel ($\sigma=20$) and then the noise level was calculated as the variance of the difference image between the original image and its smoothed version. The results were then examine to see if the standard estimate of using the difference image between the reference image and the other calibration images provided similar results to those obtained using the methodology of the present invention from equations (7) and (9). Analysis of the estimated noise levels for the three image channels and the overall estimate are summarized with boxplots as shown in FIG. 11.

Figure 11:
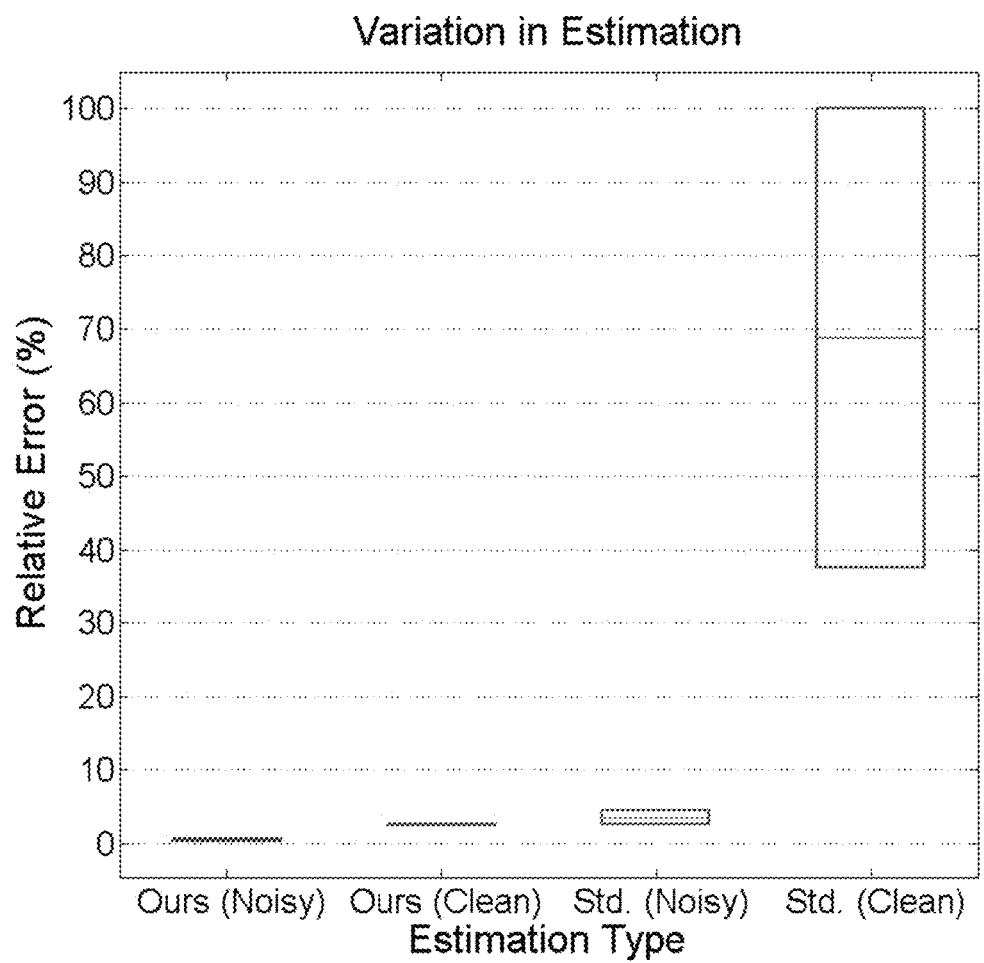
FIG. 11 is an exemplary illustration of a comparison between the method of the present invention for estimating sigma and the standard method based on the difference image.

As shown with reference to FIG. 11, the estimated $\sigma$ values are less biased and have smaller variance that the standard estimation of $\sigma$ from the difference images. The average relative error for the inventive method of estimation is 1.58% and for the standard method of estimation is 36.22%. The results obtained for this evaluation are in line with the results obtained for noise estimation for images with artificial noise. Thus, the investigation provide confidence in the estimations provided by the inventive method. As a result of the above analysis, the noise estimation method previously described is used as the noise estimation method for all of the images in the dataset and for estimating the PSNR of the denoised images.

In an exemplary embodiment demonstrating the use of the dataset for the evaluation of denoising algorithms. In this embodiment, the Active Random Field (ARF) noise reduction algorithm and the Multi Layer Perceptron (MLP) algorithm are evaluated. Each of these algorithms depends on a noise level parameter σ. The methods were evaluated for a number of values of the noise level parameter σ and the best results were reported for each method.

The ARF filters were trained using Gaussian noise (in particular the trained filters for σ=10, 15, 20, 25 and 50), with each individual RGB channel denoised separately. In one embodiment, a special version of the BM3D algorithm meant for color image denoising was employed on the noisy images of the dataset. For BM3D, the algorithm's performance was evaluated at σ=5, 10, 15, 20, 25 and 50. Finally, MLPs trained on Gaussian filters were used to denoise the images of the dataset. In particular, Gaussian filters for at σ=5, 10, 15, 20, 25 and 50 were used.

Table III shows the denoising performance of the various methods on the three different cameras. The PSNR, SSIM and VSNR were computed from values between the denoised and the best GT estimate, which is the average of the reference image and the clean image. The best results obtained for the ARF and MLP methods occurred with σ=25 filter, while the BM3D provided its best result with σ=50 filter. The results for Table III show that the ARF and MLP methodology performed relatively about the same, while BM3D performed the best on all three cameras. In particular when examining the performance between MLP and BM3D for real noisy images, these results do not lead to the same conclusions that were observed in the prior art, wherein MLP was comparable to, or even slightly outperformed, BM3D.

TABLE II

Denoising Results

| Camera | Before Denoising | ARF | BM3D | MLP |
|---|---|---|---|---|
| PSNR | | | | |
| Nikon | 29.733 | 33.575 | 36.066 | 34.451 |
| S90 | 26.186 | 26.244 | 28.184 | 26.080 |
| T3i | 27.472 | 31.828 | 34.925 | 35.523 |
| Average | 27.811 | 30.549 | 33.058 | 31.018 |
| SSIM | | | | |
| Nikon | 0.9488 | 0.9575 | 0.9708 | 0.9170 |
| S90 | 0.8531 | 0.8739 | 0.9716 | 0.9034 |
| T3i | 0.9442 | 0.9508 | 0.9716 | 0.9035 |
| Average | 0.9154 | 0.9274 | 0.9669 | 0.9080 |
| VSNR | | | | |
| Nikon | 28.420 | 31.356 | 32.334 | 31.769 |
| S90 | 25.244 | 28.330 | 29.332 | 28.356 |
| T3i | 27.302 | 30.330 | 31.090 | 30.635 |
| Average | 26.989 | 30.005 | 30.919 | 30.253 |

The images in the dataset of the present invention are large and contain real noise due to low-light settings and are acquired from commercially available cameras. In accordance with the present invention, a method is provided for obtaining pixel-aligned RAW images of low and high noise and intensity-aligned BMP images so that proper studying of the images and their noise need not be only performed in RAW format. The present invention also provides a technique to calculate the PSNR of an image without a ground truth (GT). Extensive evaluations of the noise estimation and alignment procedures have been conducted to ensure that the differences between the noisy and clean images are just noise.

The dataset of the present invention has been tested on three denoising methods, ARF, BM3D and MLP and noise levels were measured and calculated in the denoised images using a variety of different methods, such as PSNR, VSNR and SSIM. Note that while these denoising methods were trained on imaged corrupted by artificial Gaussian noise. Since these methodologies train filters and try to learn the noise structure from the noisy images, they could in fact perform even better if trained on the dataset of the present invention. The dataset of the present invention can be used for the quantitative evaluation of various noise models for digital cameras that have been developed or are currently in development.

While the various embodiments have been illustrated using commercially available digital cameras, expanding the dataset with mobile phone cameras is within the scope of the present invention. As shown with reference to Table IV, RAW images of a scene may be acquired by a LG Nexus 5 and an Xiaomi Mi3 camera using the methodology of the present invention. The RAW images from the mobile phones may be captured in DNG format using the Camera FV-5 and MI2Raw applications for the LG Nexus 5 and Xiaomi Mi3, respectively.

TABLE IV

| | | ISO (and Exposure time) per camera | | | |
|---|---|---|---|---|---|
| | Size | Reference/Clean Images | | Noisy Images | |
| Camera | (mm) | ISO | Time(s) | ISO | Time(s) |
| Nexus 5 | 4.54 × 3.42 | 100 | 1 | 400 | 1/10 |
| Mi3 | 4.69 × 3.52 | 100 | 1 | 400 | 1/13 |

The present invention may be embodied on various computing platforms that perform actions responsive to software-based methods. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described with reference to illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for generating a dataset of real noise images, the method comprising:
   acquiring a set of images of a scene, the set of images comprising a low-noise reference image, at least one noisy image and a low-noise clean image of the scene, the low-noise reference image, the at least one noisy image and the low-noise clean image comprising a plurality of pixel intensities, wherein each of the plurality of pixel intensities comprises a first plurality of bits;
   mapping the first plurality of bits of each of the pixel intensities of the low-noise reference image to a second plurality of bits using a linear mapping, wherein the second plurality of bits is less than the first plurality of bits;
   mapping the first plurality of bits of each of the pixel intensities of the at least one noisy image and the low-noise clean image to a second plurality of bits using an energy minimization linear mapping to align the at least one noisy image and the low-noise clean image with the reference image, wherein the second plurality of bits is less than the first plurality of bits; and
   storing the set of scene images mapped to the second plurality of bits in a dataset of real noise images.

2. The method of claim 1, wherein the scene is a low-light scene.

3. The method of claim 1, wherein the set of images are color images.

4. The method of claim 1, further comprising obtaining the linear mapping and the energy minimization linear mapping from blurred images of the set of images prior.

5. The method of claim 1, wherein the first plurality of bits is 16 bits and the second plurality of bits is 8 bits.

6. The method of claim 1 wherein acquiring at the one low-noise reference image further comprises, acquiring the low-noise reference image using a first light sensitivity setting and a first exposure time of a camera.

7. The method of claim 6, wherein acquiring at least one noisy image further comprises, acquiring the at least one noisy image using a second light sensitivity setting and a second exposure time of the camera, wherein the second light sensitivity setting is greater than the first light sensitivity setting and the second exposure time is shorter than the first exposure time.

8. The method of claim 6, wherein acquiring the low-noise clean image further comprises, acquiring the low-noise clean image using the first light sensitivity setting and the first exposure time of the camera.

9. The method of claim 1, wherein the low-noise reference image is acquired before the at least one noisy image.

10. The method of claim 1, wherein the low-noise clean image is acquired after the at least one noisy image.

11. The method of claim 1, wherein acquiring a set of images of a scene further comprises acquiring a plurality of sets of images of a plurality of scenes.

12. The method of claim 1, further comprising:
   calculating the peak signal-to-noise ratio (PSNR) between the low-noise reference image and the low-noise clean image;
   comparing the PSNR to a predetermined threshold value; and
   if the PSNR is substantially lower than the predetermined threshold value, discarding the set of images from the dataset of real noise images.

13. A dataset of real noise images stored on one or more non-transitory computer-readable media, the dataset comprising:
 a plurality of sets of images of a plurality of scenes, each of the plurality of set of images comprising a low-noise reference image, at least one noisy image and a low-noise clean image of one of the plurality scenes, the low-noise reference image, the at least one noisy image and the low-noise clean image comprising a plurality of pixel intensities, wherein each of the plurality of pixel intensities comprises a first plurality of bits, and wherein, for each of the plurality of sets o images, the first plurality of bits of each of the pixel intensities of the low-noise reference image is mapped to a second plurality of bits using linear mapping, and the first plurality of bits of each of the pixel intensities of the at least one noisy image and the low-noise clean image to a second plurality of bits is mapped to the second plurality of bits using energy minimization linear mapping to align the at least one noisy image and the low-noise clean image with the reference image, wherein the second plurality of bits is less than the first plurality of bits.

14. The dataset of claim 13, wherein the scene is a low-light scene.

15. The dataset of claim 13, wherein the plurality of sets of images are color images.

16. The dataset of claim 13, wherein the first plurality of bits is 16 bits and the second plurality of bits is 8 bits.

17. The dataset of claim 13, wherein for each of the plurality of sets of images, the low-noise reference image and the low-noise clean image are acquired by a camera using a first light sensitivity setting and a first exposure time.

18. The dataset of claim 17, wherein for each of the plurality of images, the at least one noisy image is acquired by a camera using a second light sensitivity setting and a second exposure time of the camera, wherein the second light sensitivity setting is greater than the first light sensitivity setting and the second exposure time is shorter than the first exposure time.

19. The method of claim 18, wherein the low-noise reference image is acquired before the at least one noisy image and the low-noise clean image is acquired after the at least one noisy image.

20. One or more non-transitory computer-readable media having computer-executable instructions for performing a method of running a software program on a computing device, the computing device operating under an operating system, the method including issuing instructions from the software program comprising:
 acquiring a set of images of a scene, the set of images comprising a low-noise reference image, at least one noisy image and a low-noise clean image of the scene, the low-noise reference image, the at least one noisy image and the low-noise clean image comprising a plurality of pixel intensities, wherein each of the plurality of pixel intensities comprises a first plurality of bits;
 mapping the first plurality of bits of each of the pixel intensities of the low-noise reference image to a second plurality of bits using linear mapping, wherein the second plurality of bits is less than the first plurality of bits;
 mapping the first plurality of bits of each of the pixel intensities of the at least one noisy image and the low-noise clean image to a second plurality of bits using energy minimization linear mapping to align the at least one noisy image and the low-noise clean image with the reference image, wherein the second plurality of bits is less than the first plurality of bits; and
 storing the set of scene images mapped to the second plurality of bits in a dataset of real noise images.

* * * * *